(12) United States Patent
Tang

(10) Patent No.: US 10,512,901 B2
(45) Date of Patent: *Dec. 24, 2019

(54) SELECTIVE CATALYTIC REDUCTION CATALYST SYSTEM

(71) Applicant: BASF Corporation, Florham Park, NJ (US)

(72) Inventor: Weiyong Tang, East Brunswick, NJ (US)

(73) Assignee: BASF Corporation, Florham Park, NJ (US)

(*) Notice: Subject to any disclaimer, the term of this patent is extended or adjusted under 35 U.S.C. 154(b) by 656 days.

This patent is subject to a terminal disclaimer.

(21) Appl. No.: 14/208,904

(22) Filed: Mar. 13, 2014

(65) Prior Publication Data

US 2014/0271422 A1 Sep. 18, 2014

Related U.S. Application Data

(60) Provisional application No. 61/781,760, filed on Mar. 14, 2013.

(51) Int. Cl.
*B01J 29/06* (2006.01)
*B01J 29/072* (2006.01)
(Continued)

(52) U.S. Cl.
CPC ........ *B01J 29/072* (2013.01); *B01D 53/9404* (2013.01); *B01D 53/9418* (2013.01); *B01D 53/9472* (2013.01); *B01D 53/9477* (2013.01); *B01D 63/066* (2013.01); *B01D 69/12* (2013.01); *B01D 69/141* (2013.01); *B01D 71/024* (2013.01); *B01D 71/028* (2013.01); *B01J 21/04* (2013.01); *B01J 21/063* (2013.01); *B01J 21/066* (2013.01); *B01J 23/02* (2013.01); *B01J 23/10* (2013.01); *B01J 23/22* (2013.01); *B01J 23/30* (2013.01); *B01J 23/72* (2013.01); *B01J 23/745* (2013.01); *B01J 29/061* (2013.01); *B01J 29/7015* (2013.01); *B01J 29/72* (2013.01); *B01J 29/723* (2013.01); *B01J 29/763* (2013.01); *B01J 29/85* (2013.01); *B01J 35/0006* (2013.01); *B01J 37/0036* (2013.01); *B01J 37/0244* (2013.01); *B01J 37/0246* (2013.01); *F01N 3/2066* (2013.01); *B01D 2251/2062* (2013.01); *B01D 2251/2067* (2013.01); *B01D 2255/2047* (2013.01); *B01D 2255/2065* (2013.01); *B01D 2255/2092* (2013.01); *B01D 2255/20707* (2013.01); *B01D 2255/20715* (2013.01); *B01D 2255/20723* (2013.01); *B01D 2255/20738* (2013.01); *B01D 2255/20761* (2013.01); *B01D 2255/20776* (2013.01); *B01D 2255/40* (2013.01); *B01D 2255/50* (2013.01); *B01D 2255/9022* (2013.01);
(Continued)

(58) Field of Classification Search
CPC . B01J 21/063; B01J 23/22; B01J 23/30; B01J 29/061; B01J 29/072; B01J 29/723; B01J 29/85; B01J 29/7015; B01J 29/763; B01J 37/0244; B01J 37/0246; B01J 35/0006; B01D 53/9418; B01D 53/9472; B01D 53/9477; B01D 59/9404; B01D 2255/20707; B01D 2255/20723; B01D 2255/20761; B01D 2255/20776; B01D 2255/50; B01D 2255/2065; B01D 2255/20715; B01D 53/9404; B01D 2255/20738; B01D 2255/40; B01D 2255/407; B01D 2255/9022; B01D 2255/9032; B01D 2255/904; B01D 2255/911; F01N 3/2066; F01N 2570/14; F01N 2570/145; F01N 2510/0684; F01N 2510/063
USPC ............. 502/60, 73, 74, 309, 312, 350, 353; 422/170, 171, 172, 177; 423/235, 239.1, 423/239.2
See application file for complete search history.

(56) References Cited

U.S. PATENT DOCUMENTS 3,030,181 A 4/1962 Milton et al.
4,268,488 A 5/1981 Ginger
(Continued)

FOREIGN PATENT DOCUMENTS

DE 102007003155 A1 7/2008
EP 1876331 8/2009
(Continued)

OTHER PUBLICATIONS

English Language Abst. of DE 102007003155 Jul. 24, 2008.
(Continued)

*Primary Examiner* — Elizabeth D Wood
(74) *Attorney, Agent, or Firm* — Womble Bond Dickinson (US) LLP

(57) ABSTRACT

Described are SCR catalyst systems comprising a first SCR catalyst composition and a second SCR catalyst composition arranged in the system, the first SCR catalyst composition promoting higher $N_2$ formation and lower $N_2O$ formation than the second SCR catalyst composition, and the second SCR catalyst composition having a different composition than the first SCR catalyst composition, the second SCR catalyst composition promoting lower $N_2$ formation and higher $N_2O$ formation than the first SCR catalyst composition. The SCR catalyst systems are useful in methods and systems to catalyze the reduction of nitrogen oxides in the presence of a reductant.

20 Claims, 11 Drawing Sheets

(51) Int. Cl.
| | |
|---|---|
| F01N 3/20 | (2006.01) |
| B01J 23/22 | (2006.01) |
| B01J 23/30 | (2006.01) |
| B01D 63/06 | (2006.01) |
| B01D 69/12 | (2006.01) |
| B01D 69/14 | (2006.01) |
| B01D 71/02 | (2006.01) |
| B01D 53/94 | (2006.01) |
| B01J 37/02 | (2006.01) |
| B01J 35/00 | (2006.01) |
| B01J 23/02 | (2006.01) |
| B01J 23/10 | (2006.01) |
| B01J 23/72 | (2006.01) |
| B01J 23/745 | (2006.01) |
| B01J 29/72 | (2006.01) |
| B01J 29/85 | (2006.01) |
| B01J 21/04 | (2006.01) |
| B01J 21/06 | (2006.01) |
| B01J 29/70 | (2006.01) |
| B01J 29/76 | (2006.01) |
| B01J 37/00 | (2006.01) |
| B01J 29/50 | (2006.01) |

(52) U.S. Cl.
CPC  *B01D 2255/9032* (2013.01); *B01D 2255/911* (2013.01); *B01D 2258/012* (2013.01); *B01D 2325/10* (2013.01); *B01J 29/50* (2013.01); *F01N 2510/0682* (2013.01); *F01N 2510/0684* (2013.01); *F01N 2570/18* (2013.01); *Y02C 20/10* (2013.01); *Y02T 10/24* (2013.01); *Y10S 502/52712* (2013.01); *Y10S 502/52713* (2013.01)

(56) References Cited

U.S. PATENT DOCUMENTS

| | | | |
|---|---|---|---|
| 4,440,871 A | 4/1984 | Lok et al. | |
| 4,544,538 A | 10/1985 | Zones | |
| 4,735,927 A | 4/1988 | Gerdes et al. | |
| 4,798,813 A | 1/1989 | Kato et al. | |
| 4,952,545 A | 8/1990 | Imanari et al. | |
| 5,409,681 A | 4/1995 | Kato et al. | |
| 5,516,497 A | 5/1996 | Speronello et al. | |
| 5,833,932 A | 11/1998 | Schmelz | |
| 6,125,629 A | 10/2000 | Patchett | |
| 6,162,415 A | 12/2000 | Liu et al. | |
| 7,264,789 B1 | 9/2007 | Verduijn et al. | |
| 7,462,340 B2 | 12/2008 | Schwefer et al. | |
| 7,601,622 B2 | 10/2009 | Kim | |
| 7,951,742 B2 | 5/2011 | Chen et al. | |
| 8,741,240 B2 | 6/2014 | Hihara et al. | |
| 8,776,499 B2 * | 7/2014 | Huennekes | B01D 53/88 60/286 |
| 9,017,626 B2 | 4/2015 | Tang et al. | |
| 2008/0008629 A1 | 1/2008 | Doring et al. | |
| 2008/0241034 A1 | 10/2008 | Schwefer et al. | |
| 2009/0196812 A1 | 8/2009 | Bull et al. | |
| 2009/0285737 A1 | 11/2009 | Bull et al. | |
| 2010/0166628 A1 | 7/2010 | Soeger et al. | |
| 2013/0121902 A1 | 5/2013 | Adelmann et al. | |
| 2014/0274665 A1 | 9/2014 | Vaarkamp et al. | |

FOREIGN PATENT DOCUMENTS

| | | |
|---|---|---|
| EP | 2 230 001 | 9/2010 |
| EP | 2 382 031 | 5/2017 |
| GB | 868846 | 5/1961 |
| GB | 2493449 A | 2/2013 |
| JP | H 04-59054 | 2/1992 |
| JP | 2006057578 | 3/2006 |
| JP | 2006-136776 | 6/2006 |
| JP | 2010-524677 | 7/2010 |
| JP | 2010-179204 | 8/2010 |
| JP | 2011-518658 | 6/2011 |
| WO | WO 2010/075345 | 7/2010 |
| WO | 2011/131324 A1 | 10/2011 |
| WO | WO 2012/168277 | 12/2012 |

OTHER PUBLICATIONS

International Search Report dated Jul. 7, 2014.
Kröcher, Oliver et al., Combination of $V_2O_4/WO_3$—$TiO_2$, Fe—ZSM5, and Cu—ZSM5 Catalysts for the Selective Catalytic Reduction of Nitric Oxide with Ammonia, *Ind. Eng. Chem. Res.* vol. 47 2008, 8588-8593.

* cited by examiner

SELECTIVE CATALYTIC REDUCTION CATALYST SYSTEM

CROSS-REFERENCE TO RELATED APPLICATIONS

This application claims the benefit of priority under 35 U.S.C. § 119(e) to U.S. Provisional Patent Application No. 61/781,760, filed on Mar. 13, 2013, which is hereby incorporated by reference in its entirety.

TECHNICAL FIELD

The present invention pertains to the field of selective catalytic reduction catalysts. More particularly, embodiments of the invention relate to selective catalytic reduction catalyst systems comprising a first SCR catalyst composition and a second SCR catalyst composition, a lean burn engine exhaust system, and methods of using these catalyst systems in a variety of processes such as abating pollutants in exhaust gases.

BACKGROUND

Operation of lean burn engines, e.g. diesel engines and lean burn gasoline engines, provide the user with excellent fuel economy and have very low emissions of gas phase hydrocarbons and carbon monoxide due to their operation at high air/fuel ratios under fuel lean conditions. Diesel engines, in particular, also offer significant advantages over gasoline engines in terms of their durability and their ability to generate high torque at low speed.

From the standpoint of emissions, however, diesel engines present problems more severe than their spark-ignition counterparts. Emission problems relating to particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others. NO is of concern because it is believed to under a process known as photo-chemical smog formation, through a series of reactions in the presence of sunlight and hydrocarbons, and NO is a significant contributor to acid rain. $NO_2$, on the other hand, has a high potential as an oxidant and is a strong lung irritant. Particulates (PM) are also connected with respiratory problems. As engine operation modifications are made to reduce particulates and unburned hydrocarbons on diesel engines, the NO and $NO_2$ emissions tend to increase.

Effective abatement of $NO_x$ from lean burn engines is difficult to achieve because high $NO_x$ conversion rates typically require reductant-rich conditions. Conversion of the $NO_x$ component of exhaust streams to innocuous components generally requires specialized $NO_x$ abatement strategies for operation under fuel lean conditions Selective catalytic reduction (SCR), using ammonia or ammonia precursor as reducing agent is believed to be the most viable technique for the removal of nitrogen oxides from the exhaust of diesel vehicles. In typical exhaust, the nitrogen oxides are mainly composed of NO (>90%), so the SCR catalyst favors the conversion of NO and $NH_3$ into nitrogen and water. Two major challenges in developing catalysts for the automotive application of the ammonia SCR process are to provide a wide operating window for SCR activity, including low temperatures of from 200° C. and higher and improvement of the catalyst's hydrothermal stability for temperatures above 500° C. As used herein hydrothermal stability refers to retention of a material's capability to catalyze the SCR of $NO_x$, with a preference for the retention to be at least 85% of the material's $NO_x$ conversion ability prior to hydrothermal aging.

Metal-promoted zeolite catalysts including, among others, iron-promoted and copper-promoted zeolite catalysts, where, for instance, the metal is introduced via ion-exchange, for the selective catalytic reduction of nitrogen oxides with ammonia are known. Iron-promoted zeolite beta has been an effective catalyst for the selective reduction of nitrogen oxides with ammonia. Unfortunately, it has been found that under harsh hydrothermal conditions, such as reduction of $NO_x$ from gas exhaust at temperatures exceeding 500° C., the activity of many metal-promoted zeolites, such as Cu and Fe versions of ZSM-5 and Beta, begins to decline. This decline in activity is believed to be due to destabilization of the zeolite such as by dealumination and consequent loss of metal-containing catalytic sites within the zeolite.

To maintain the overall activity of $NO_x$ reduction, increased levels of the washcoat loading of the iron-promoted zeolite catalyst must be provided. As the levels of the zeolite catalyst are increased to provide adequate $NO_x$ removal, there is an obvious reduction in the cost efficiency of the process for $NO_x$ removal as the costs of the catalyst rise.

In some SCR systems, particularly heavy duty diesel (HDD), controlling secondary pollutant $N_2O$ emitted from the SCR system has become more important. Additionally, certain existing catalysts, such as copper promoted zeolites (e.g Cu-SSZ-13), tend to produce unacceptably high $N_2O$ emissions. Because $N_2O$ is a greenhouse gas and emissions regulations are becoming increasingly stringent, there is a need for systems that reduce the amount of $N_2O$ emitted from SCR systems.

SUMMARY

One aspect of the invention pertains to a selective catalytic reduction (SCR) catalyst system. In a first embodiment, the system comprises a first SCR catalyst composition and a second SCR catalyst composition arranged in the system, the first SCR catalyst composition promoting higher $N_2$ formation and lower $N_2O$ formation than the second SCR catalyst composition, and the second SCR catalyst composition having a different composition than the first SCR catalyst composition, the second SCR catalyst composition promoting lower $N_2$ formation and higher $N_2O$ formation than the first SCR catalyst composition.

In a second embodiment, the first SCR catalyst composition is modified so that the first SCR catalyst composition and the second SCR catalyst composition are disposed on a common substrate.

In a third embodiment, the SCR catalyst system the first or second embodiments is modified so that the first SCR catalyst composition is located upstream of the second SCR catalyst composition.

In a fourth embodiment, the SCR catalyst system of the first through third embodiments is modified so that the first SCR catalyst composition and the second SCR catalyst composition are disposed on different substrates.

In a fifth embodiment, the system of the first through fourth embodiments is modified so that first SCR catalyst composition is located upstream of the second SCR catalyst composition.

In a sixth embodiment, the first or second embodiments are modified wherein the first SCR catalyst composition and the second SCR catalyst composition are in a layered relationship, with the first SCR catalyst composition layered on top of the second SCR catalyst composition.

In seventh embodiment, any of the first through sixth embodiments, the SCR catalyst system of claim the first SCR catalyst composition comprises a mixed oxide.

In an eighth embodiment, seventh embodiment can be modified so that the mixed oxide is selected from Fe/titania, Fe/alumina, Mg/titania, Cu/titania, Ce/Zr, vanadia/titania, and mixtures thereof.

In a ninth embodiment, the eighth embodiment is modified so that the mixed oxide comprises vanadia/titania.

In a tenth embodiment, the ninth embodiment is modified so that the vanadia/titania is stabilized with tungsten.

In an eleventh embodiment, any of the first through tenth embodiments can be modified wherein the second SCR catalyst comprises a metal-exchanged 8-ring small pore molecular sieve.

In a twelfth embodiment, the eleventh embodiment can be modified wherein the molecular sieve has a structure type selected from the group consisting of AEI, AFT, AFX, CHA, EAB, ERI, KFI, LEV, SAS, SAT, DDR, and SAV.

In a thirteenth embodiment, the twelfth embodiment is modified wherein the molecular sieve is an aluminosilicate zeolite and has the CHA structure type.

In a fourteenth embodiment, the thirteenth embodiment is modified wherein the zeolite is selected from SSZ-13 and SSZ-62.

In a fifteenth embodiment, any of the eleventh through fourteenth embodiments can be modified wherein the metal is selected from the group consisting of Cu, Fe, Co, Ce and Ni.

In a sixteenth embodiment, the fifteenth embodiment is modified, wherein the metal is selected from Cu.

In a seventeenth embodiment, the sixteenth embodiment is modified, wherein the zeolite is exchanged with Cu in the range of 2% to 8% by weight.

An eighteenth embodiment pertains to a selective catalytic reduction (SCR) catalyst system comprising a first SCR catalyst composition comprising vanadia/titania disposed on a substrate and a second SCR catalyst composition comprising a metal-exchanged 8-ring small pore molecular sieve disposed on a substrate.

In a nineteenth embodiment, the eighteenth embodiment is modified, wherein molecular sieve has a structure type selected from the group consisting of AEI, AFT, AFX, CHA, EAB, ERI, KFI, LEV, SAS, SAT, DDR, and SAV.

In a twentieth embodiment, the nineteenth embodiment is modified, wherein the molecular sieve is an aluminosilicate zeolite and has the CHA structure type.

In a twenty-first embodiment, the twentieth embodiment is modified, wherein the zeolite is selected from SSZ-13 and SSZ-62.

In a twenty-second embodiment, the eighteenth through twenty-first embodiments are modified, wherein the metal is selected from the group consisting of Cu, Fe, Co, Ce and Ni.

In a twenty-third embodiment, the twenty-second embodiment are modified, wherein the metal is selected from Cu.

In a twenty-fourth embodiment the eighteenth through twenty-third embodiments are modified, wherein the zeolite is exchanged with Cu in the range of 2% to 8% by weight.

In a twenty-fifth embodiment, the eighteenth through twenty-fourth embodiments are modified wherein the vanadia/titania is stabilized with tungsten.

In a twenty-sixth embodiment, the eighteenth through twenty-fifth embodiments are modified, wherein the first SCR catalyst composition and second SCR catalyst composition are disposed on a common substrate.

In a twenty-seventh embodiment, the eighteenth through twenty-sixth embodiments are modified, wherein the first SCR catalyst composition is located upstream of the second SCR catalyst composition.

In a twenty-eighth embodiment, the eighteenth through twenty-seventh embodiments are modified, wherein vanadia/titania promotes higher $N_2$ formation and lower N2O formation than the metal-exchanged 8-ring small pore molecular sieve, and wherein the metal-exchanged 8-ring small pore molecular sieve promotes lower $N_2$ formation and higher $N_2O$ formation than the vanadia/titania.

In a twenty-ninth embodiment, the eighteenth through twenty-fifth embodiments are modified, where the first SCR catalyst composition and second SCR catalyst composition are disposed on separate substrates.

In a thirtieth embodiment, the twenty ninth embodiment is modified, wherein the first SCR catalyst composition is located upstream of the second SCR catalyst composition.

In a thirty-first embodiment, the twenty-sixth embodiment is modified wherein the first SCR catalyst composition and the second SCR catalyst composition are in a layered relationship, with the first SCR catalyst composition is layered on top of the second SCR catalyst composition.

In a thirty-second embodiment, the thirty-first embodiment is modified, wherein molecular sieve has a structure type selected from the group consisting of AEI, AFT, AFX, CHA, EAB, ERI, KFI, LEV, SAS, SAT, DDR, and SAV.

In a thirty-third embodiment, the thirty-second embodiment is modified, wherein the molecular sieve is an aluminosilicate zeolite and has the CHA structure type.

In a thirty-fourth embodiment, the thirty-third embodiment is modified, wherein the zeolite is selected from SSZ-13 and SSZ-62.

In a thirty-fifth embodiment, the thirty-first through thirty-fourth embodiments are modified, wherein the metal is selected from the group consisting of Cu, Fe, Co, Ce, and Ni.

In a thirty sixth embodiment, the thirty fifth embodiment is modified, wherein the metal is selected from Cu.

In a thirty seventh embodiment, the thirty-third embodiment is modified, wherein the zeolite is exchanged with Cu.

In a thirty-eighth embodiment, the thirty-first through thirty-seventh embodiments are modified, wherein the vanadia/titania is stabilized with tungsten.

Another aspect of the invention pertains to a lean burn engine exhaust as treatment system. In a thirty-ninth embodiment, a lean burn engine exhaust gas treatment system comprises the catalyst system of any of the first through thirty-seventh embodiments, a lean burn engine, and an exhaust gas conduit in fluid communication with the lean burn engine, wherein the catalyst system is downstream of the engine.

In a fortieth embodiment, the thirty-ninth embodiment is modified, wherein the engine is a heavy duty diesel engine.

Another aspect of the invention pertains to a method of removing nitrogen oxides from exhaust gas of a lean burn engine. In a forty-first embodiment, a method of removing nitrogen oxides from exhaust gas from a lean burn engine, the method comprising contacting an exhaust gas stream with a selective catalytic reduction (SCR) catalyst system including a first SCR catalyst composition comprising vanadia/titania disposed on a substrate and a second SCR catalyst composition comprising a metal-exchanged 8-ring small pore molecular sieve disposed on a substrate.

In a forty-second embodiment, the forty-first embodiment is modified, wherein the exhaust gas comprises $NO_x$.

In a forty-third embodiment, the forty-first and forty-second embodiments are modified, wherein the lean burn engine is a heavy duty diesel engine.

In a forty-fourth embodiment, a lean burn engine exhaust gas treatment system comprises the catalyst system of the nineteenth embodiment, a lean burn engine, and an exhaust gas conduit in fluid communication with the lean burn engine, wherein the catalyst system is downstream of the engine.

In a forty-fifth embodiment, the forty-fourth embodiment is modified, wherein the engine is a heavy duty diesel engine.

A forty-sixth embodiment pertains to a method of removing nitrogen oxides from exhaust gas from a lean burn engine, the method comprising contacting the exhaust gas with selective catalytic reduction (SCR) catalyst system including a first SCR catalyst composition and a second SCR catalyst composition arranged in the system, the first SCR catalyst composition promoting higher $N_2$ formation and lower $N_2O$ formation than the second catalyst composition, and the second catalyst composition having a different composition than the first SCR catalyst composition, the second catalyst composition promoting lower $N_2$ formation and higher $N_2O$ formation than the first SCR catalyst composition.

In a forty-seventh embodiment, the first through thirty seventh embodiments are modified, wherein the second catalyst composition has a higher $NH_3$ storage capacity that the first catalyst composition.

In a forty-eighth embodiment, a selective catalytic reduction (SCR) catalyst hybrid system for removing NOx from engine exhaust, the system comprises a first SCR catalyst composition and a second SCR catalyst composition arranged in the system, the first SCR catalyst composition having a faster DeNOx response time when exposed to ammonia than the second catalyst composition and the second SCR catalyst composition has a higher steady state DeNOx performance than the first catalyst composition and the first SCR catalyst composition provides a target DeNOx percentage at a lower ammonia storage level than the second SCR catalyst composition to provide the same DeNOx percentage, and wherein the system provides higher DeNOx steady state performance than the first catalyst composition.

In a forty-ninth embodiment, the forty-eighth embodiment is modified, wherein under acceleration conditions in which sudden increases of exhaust temperature are produced, ammonia desorbed from the hybrid system due to the temperature increase is less than ammonia desorbed from a system having only the second catalyst composition.

In a fiftieth embodiment, the forty-eight or forty-ninth embodiments are modified, wherein the first catalyst composition comprises vanadia/titania stabilized with tungsten.

In a fifty-first embodiment, the fiftieth embodiment is modified, wherein the second catalyst composition comprises a metal-exchanged 8-ring small pore molecular sieve.

In a fifty-second embodiment, the fifty-first embodiment is modified, wherein the molecular sieve has a structure type selected from the group consisting of AEI, AFT, AFX, CHA, EAB, ERI, KFI, LEV, SAS, SAT, DDR, and SAV.

In a fifty-third embodiment, the fifty-second embodiment is modified, wherein the molecular sieve is an aluminosilicate zeolite and has the CHA structure type.

In a fifty-fourth embodiment, the forty-eighth through fifty-third embodiments are modified, wherein the zeolite is selected from SSZ-13 and SSZ-62 and the metal comprises Cu.

In a fifty fifth embodiment, the system of the first through thirty-eighth embodiments are modified wherein the first SCR catalyst composition promotes higher $N_2$ formation and lower $N_2O$ formation than the second SCR catalyst composition, and the second SCR catalyst composition promotes lower $N_2$ formation and higher $N_2O$ formation for a temperature range of 200° C. to 600° C.

In a fifty-sixth embodiment, the forty-eighth through fifty-fourth embodiments are modified, wherein the first SCR catalyst composition has a faster DeNOx response time when exposed to ammonia than the second catalyst composition and the second SCR catalyst composition has a higher steady state DeNOx performance than the first catalyst composition and the first SCR catalyst composition provides a target DeNOx percentage at a lower ammonia storage level than the second SCR catalyst composition to provide the same DeNOx percentage, and wherein the system provides higher DeNOx steady state performance than the first catalyst composition formation for a temperature range of 200° C. to 600° C.

DETAILED DESCRIPTION

Figure 1:
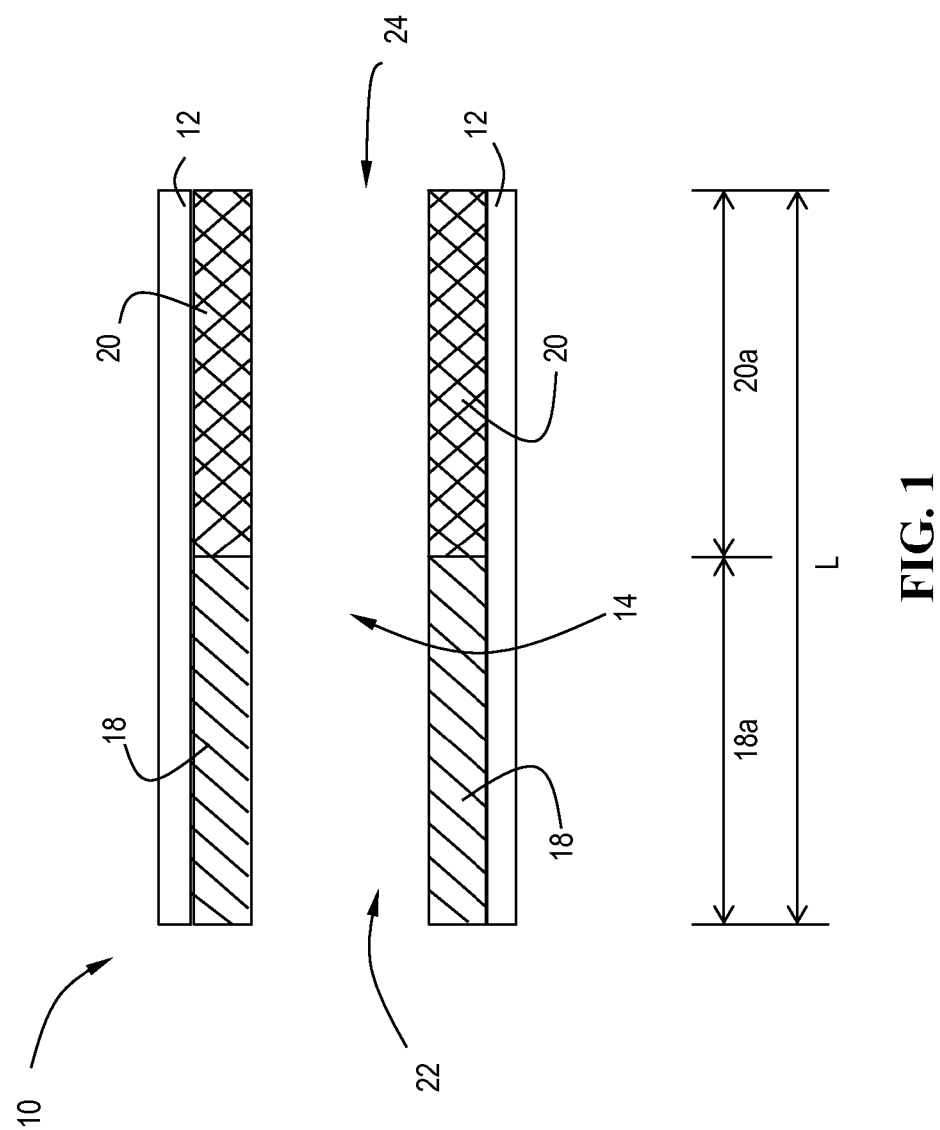
FIG. 1 shows a partial cross-sectional view of a SCR catalyst system according to one or more embodiments.

Before describing several exemplary embodiments of the invention, it is to be understood that the invention is not limited to the details of construction or process steps set forth in the following description. The invention is capable of other embodiments and of being practiced or being carried out in various ways.

Governmental regulations require the use of $NO_x$ reduction technologies for light and heavy-duty lean burn engine vehicles. Selective catalytic reduction (SCR) of $NO_x$ using urea is an effective and dominant emission control technology for $NO_x$ control. To meet future governmental regulations, an SCR catalyst system that has improved performance compared to the current Cu-SSZ-13 based systems. Embodiments of the invention pertain to an SCR catalyst system having lower $N_2O$ emissions and also $NO_x$ conversion efficiency improvement at low $NH_3$ storage levels than single SCR catalysts and other dual SCR catalyst systems. Without intending to be bound by theory, it is thought that the dynamic response of the SCR catalyst system according to one or more embodiments is provided by improved $NH_3$ storage capacity. The features of the invention described herein should be provided over the entire SCR temperature range of interest, namely 200° C. to 600° C. According to one or more embodiments, the first and second SCR catalyst compositions exclude platinum group metals such as Pt, Pd and Rh.

Embodiments of the invention are directed to SCR catalyst systems, methods for their preparation, exhaust gas purification systems, and methods of abating nitrogen oxides from exhaust gases using such SCR catalyst systems.

Embodiments are directed to the use of SCR catalyst systems providing improved $NO_x$ performance for lean burn engines. While the SCR catalyst systems can be used in any lean burn engine, in specific embodiments, the catalyst systems are to be used in heavy duty diesel applications. Heavy duty diesel applications include diesel engine powered vehicles having a gross vehicle weight rating (GVWR) of above 8,500 lbs federally and above 14,000 lbs in California (model year 1995 and later). The SCR catalyst systems according to embodiments may have use in other engines as well, including, but not limited to, nonroad diesel engines, locomotives, marine engines, and stationary diesel engines. The invention may have applicability to other lean burn engines types as well such as light duty diesel, compressed natural gas and lean burn gasoline direct injected engines.

With respect to the terms used in this disclosure, the following definitions are provided.

As used herein, the term "catalyst" or "catalyst composition" refers to a material that promotes a reaction. As used herein, the phrase "catalyst system" refers to a combination of two or more catalysts, for example a combination of a first SCR catalyst and a second SCR catalyst. The catalyst system may be in the form of a washcoat in which the two SCR catalysts are mixed together.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

As used herein, the term "stream" broadly refers to any combination of flowing gas that may contain solid or liquid particulate matter. The term "gaseous stream" or "exhaust gas stream" means a stream of gaseous constituents, such as the exhaust of a lean burn engine, which may contain entrained non-gaseous components such as liquid droplets, solid particulates, and the like. The exhaust gas stream of a lean burn engine typically further comprises combustion products, products of incomplete combustion, oxides of nitrogen, combustible and/or carbonaceous particulate matter (soot), and un-reacted oxygen and nitrogen.

As used herein, the term "substrate" refers to the monolithic material onto which the catalyst composition is placed, typically in the form of a washcoat containing a plurality of particles containing a catalytic composition thereon. A washcoat is formed by preparing a slurry containing a specified solids content (e.g., 30-90% by weight) of particles in a liquid vehicle, which is then coated onto a substrate and dried to provide a washcoat layer.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

"Catalytic article" refers to an element that is used to promote a desired reaction. For example, a catalytic article may comprise a washcoat containing catalytic compositions on a substrate.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst compositions of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

According to a first aspect of the invention, a selective catalytic reduction (SCR) catalyst system comprises a first SCR catalyst composition and a second SCR catalyst composition arranged in the system. In one or more embodiments, the second SCR catalyst composition has a different composition than first SCR catalyst composition. The first SCR catalyst composition promotes higher $N_2$ formation and lower $N_2O$ formation than the second SCR catalyst composition, while the second catalyst composition promotes lower $N_2$ formation and higher $N_2O$ formation than the first SCR catalyst composition. To reduce $NH_3$ emissions, in one or more embodiments, the first SCR catalyst should have a lower $NH_3$ adsorption capacity/desorption temperature than the second SCR catalyst composition.

In one or more embodiments, the first SCR catalyst composition and the second SCR catalyst composition are on the same or a common substrate. In other embodiments, the first SCR catalyst composition and second SCR catalyst composition are on separate substrates.

In one embodiment, the first SCR catalyst and the second SCR catalyst are arranged in a laterally zoned configuration, with the first catalyst upstream from the second catalyst. The upstream and downstream catalysts can be arranged on the same substrate or on different substrates separated from each other. In another specific embodiment, the first SCR catalyst and the second SCR catalyst are in a layered arrangement with the second SCR catalyst being disposed on a substrate and the first SCR catalyst in a layer overlying the second SCR catalyst. Each of these embodiments will be described in more detail below.

In specific embodiments, each of the first SCR catalyst composition and second SCR catalyst composition is used as a molded catalyst, still more specifically as a molded catalyst wherein the SCR catalyst composition is deposited on a suitable refractory substrate, still more specifically on a "honeycomb" substrate, for the selective reduction of nitrogen oxides $NO_x$, i.e. for selective catalytic reduction of nitrogen oxides. According to embodiments of the invention, the SCR catalyst composition can be in the form of self-supporting catalyst particles or as a honeycomb monolith formed of the SCR catalyst composition.

According to one or more embodiments, the first SCR catalyst composition comprises a mixed oxide. As used herein, the term "mixed oxide" refers to an oxide that contains cations of more than one chemical element or cations of a single element in several states of oxidation. In one or more embodiments, the mixed oxide is selected from Fe/titania (e.g. $FeTiO_3$), Fe/alumina (e.g. $FeAl_2O_3$), Mg/titania (e.g. $MgTiO_3$), Mg/alumina (e.g. $MgAl_2O_3$), Mn/alumina, Mn/titania (e.g. $MnO_x/TiO_2$) (e.g. $MnO_x/Al_2O_3$), Cu/titania (e.g. $CuTiO_3$), Ce/Zr (e.g. $CeZrO_2$), Ti/Zr (e.g. $TiZrO_2$), vanadia/titania (e.g. $V_2O_5/TiO_2$), and mixtures thereof. In specific embodiments, the mixed oxide comprises vanadia/titania. The vanadia/titania oxide can be activated or stabilized with tungsten (e.g. $WO_3$) to provide $V_2O_5/TiO_2/WO_3$.

According to one or more embodiments, a first SCR catalyst composition comprising vanadia/titania generates significantly less $N_2O$ than zeolite SCR catalysts, especially under rich $NO_2$ conditions. In one or more embodiments, the first SCR catalyst composition comprises titania on to which vanadia has been dispersed. The vanadia can be dispersed at concentrations ranging from 1 to 10 wt %, including 1, 2, 3, 4, 5, 6, 7, 8, 9, 10 wt %. In specific embodiments the vanadia is activated or stabilized by tungsten ($WO_3$). The tungsten can be dispersed at concentrations ranging from 0.5 to 10 wt %, including 1, 2, 3, 3. 4, 5, 6, 7, 8, 9, and 10, wt %. All percentages are on an oxide basis.

According to one or more embodiments, the second SCR catalyst comprises a metal-exchanged molecular sieve. The metal is selected from Cu, Fe, Co, Ni, Ce and Pt. In specific embodiments, the metal is Cu.

As used herein, the term "molecular sieves" refers to materials based on an extensive three-dimensional network of oxygen ions containing generally tetrahedral type sites and having a pore distribution. Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter.

Catalyst compositions employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

According to specific embodiments, the molecular sieves of the second SCR catalyst composition have 8-ring pore openings and double-six ring secondary building units, for example, those having the following structure types: AEI, AFT, AFX, CHA, EAB, ERI, KFI, LEV, SAS, SAT, DDR, and SAV. According to one or more embodiments, it will be appreciated that by defining the molecular sieves by their structure type, it is intended to include the structure type and any and all isotypic framework materials such as SAPO, AlPO and MeAPO materials having the same structure type.

Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (having a pore size in at least one dimension of less than 4.3 Angstroms, e.g. about 3.8 Angstroms) accessible through its 3-dimensional porosity. A cage like structure results from the connection of double six-ring building units by 4 rings.

Metal-promoted, particularly copper-promoted aluminosilicate zeolites having the CHA structure type (e.g., SSZ-13 and SSZ-62) and a silica to alumina molar ratio greater than 1, particularly those having a silica to alumina ratio greater than or equal to 5, 10, or 15 and less than about 1000, 500, 250, 100 and 50 have recently solicited a high degree of interest as catalysts for the SCR of oxides of nitrogen in lean burning engines using nitrogenous reductants. This is because of the wide temperature window coupled with the excellent hydrothermal durability of these materials, as described in U.S. Pat. No. 7,601,662. Prior to the discovery of metal promoted zeolites described in U.S. Pat. No. 7,601,662, while the literature had indicated that a large number of metal-promoted zeolites had been proposed in the patent and scientific literature for use as SCR catalysts, each of the proposed materials suffered from one or both of the following defects: (1) poor conversion of oxides of nitrogen at low temperatures, for example 350° C. and lower; and (2) poor hydrothermal stability marked by a significant decline in catalytic activity in the conversion of oxides of nitrogen by SCR. Thus, the invention described in U.S. Pat. No. 7,601,662 addressed a compelling, unsolved need to provide a material that would provide conversion of oxides of nitrogen at low temperatures and retention of SCR catalytic activity after hydrothermal aging at temperatures in excess of 650° C.

Zeolitic chabazite include a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a molecular sieve having the chabazite crystal structure, silicoaluminophosphate 34 (SAPO-34), is described in U.S. Pat. No. 4,440,871 and U.S. Pat. No. 7,264,789, which are hereby incorporated by reference. A method of making yet another synthetic molecular sieve having chabazite structure, SAPO-44, is described in U.S. Pat. No. 6,162,415, which is hereby incorporated by reference.

In more specific embodiments, reference to an aluminosilicate zeolite structure type limits the material to molecular sieves that do not include phosphorus or other metals substituted in the framework. Of course, aluminosilicate zeolites may be subsequently ion-exchanged with one or more promoter metals such as iron, copper, cobalt, nickel, cerium or platinum group metals. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. In one or more embodiments, the molecular sieve can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

In one or more embodiments, the molecular sieve of the second SCR catalyst composition has a structure type selected from the group consisting of AEI, AFT, AFX, CHA, EAB, ERI, KFI, LEV, SAS, SAT, DDR, and SAV. In a specific embodiment, the molecular sieve is an aluminosilicate zeolite and has the CHA structure type, for example SSZ-13 or SSZ-62. In another specific embodiment, the molecular sieve is an aluminosilicate zeolite and has the AEI structure type, for example SSZ-39.

In specific embodiments, the 8-ring small pore molecular sieve promoted with copper has a mole ratio of silica to alumina greater than about 15, even more specifically greater than about 20. In specific embodiments, the 8-ring small pore molecular sieve promoted with copper has a mole ratio of silica to alumina in the range from about 20 to about 256, more specifically in the range from about 25 to about 40.

In specific embodiments, the atomic ratio of copper to aluminum exceeds about 0.25. In more specific embodiments, the ratio of copper to aluminum is from about 0.25 to about 1, even more specifically from about 0.25 to about 0.5. In even more specific embodiments, the ratio of copper to aluminum is from about 0.3 to about 0.4.

In general, the SCR catalyst system according to one or more embodiments should exhibit both good low temperature $NO_x$ conversion activity ($NO_x$ conversion >50% at 200° C.) and good high temperature $NO_x$ conversion activity ($NO_x$ conversion >70% at 450° C.). The $NO_x$ activity is measured under steady state conditions at maximum $NH_3$-slip conditions in a gas mixture of 500 ppm NO, 500 ppm $NH_3$, 10% $O_2$, 5% $H_2O$, balance $N_2$ at a volume-based space velocity of 80,000 h$^{-1}$.

According to one or more embodiments, to reduce $NH_3$ emissions, the first SCR catalyst composition should have a lower $NH_3$ adsorption/desorption temperature than the second SCR catalyst composition.

According to one or more embodiments, the second SCR catalyst composition comprises a metal-exchanged 8-ring small pore molecular sieve. In other words, the second SCR catalyst composition is an 8-ring small pore molecular sieve that is promoted with a metal. In one or more embodiments, the metal can be selected from the group consisting of Cu, Fe, Co, Ce, and Ni. In a specific embodiment, the metal is selected from Cu.

Wt % of Promoter Metal:

The promoter metal (e.g. Cu) content of the metal-exchanged 8-ring small pore molecular sieve, calculated as the metal oxide, in specific embodiments is at least about 2 wt.-%, even more specifically at least about 2.5 wt.-% and in even more specific embodiments at least about 3 wt.-%, reported on a volatile-free basis. In even more specific embodiments, the metal (e.g. Cu) content of the metal-exchange 8-ring small pore molecular sieve, calculated as the metal oxide, is in the range of up to about 8 wt.-%, based on the total weight of the calcined molecular sieve reported on a volatile free basis. Therefore, in specific embodiments, ranges of the 8-ring small pore molecular sieve promoted with a metal selected from Cu, Fe, Co, Ce, and Ni, calculated as the metal oxide, are from about 2 to about 8 wt.-%, more specifically from about 2 to about 5 wt.-%, and even more specifically from about 2.5 to about 3.5 wt.-%, in each case reported on an oxide basis.

In one or more embodiments, the first SCR catalyst and the second SCR catalyst are arranged in a laterally zoned configuration, with the first catalyst upstream from the second catalyst. As used herein, the term "laterally zoned" refers to the location of the two SCR catalysts relative to one another. Lateral means side-by-side such that the first SCR catalyst composition and the second SCR catalyst composition are located one beside the other with the first SCR catalyst composition upstream of the second SCR catalyst composition. According to one or more embodiments, the laterally zoned first and second SCR catalysts can be arranged on the same or a common substrate or on different substrates separated from each other.

According to one or more embodiments, the vanadia/titania and the metal-exchanged 8-ring small pore molecular sieve are disposed on a common or the same substrate. In other embodiments, the vanadia/titania and the metal-exchanged 8-ring small pore molecular sieve are disposed on separate substrates. Whether on the same substrate or on different substrates, according to one or more embodiments, the vanadia/titania is located upstream of the metal-exchanged 8-ring small pore molecular sieve.

In one or more embodiments, the vandia/titania promotes higher $N_2$ formation and lower $N_2O$ formation than the metal-exchanged 8-ring small pore molecular sieve, and the metal-exchanged 8-ring small pore molecular sieve promotes lower $N_2$ formation and higher $N_2O$ formation than the vanadia/titania.

Compositions used commercially, especially in mobile applications, comprise $TiO_2$ on to which $WO_3$ and $V_2O_5$ have been dispersed at concentrations ranging from 5 to 20 wt. % and 0.5 to 6 wt. %, respectively. These catalysts may contain other inorganic materials such as $SiO_2$ and $ZrO_2$ acting as binders and promoters.

Referring to FIG. 1, an exemplary embodiment of a laterally spaced system is shown. The SCR catalyst system 10 is shown in a laterally zoned arrangement where the first SCR catalyst composition 18 is located upstream of the second SCR catalyst composition 20 on a common substrate 12. The substrate 12 has an inlet end 22 and an outlet end 24 defining an axial length L. In one or more embodiments, the substrate 12 generally comprises a plurality of channels 14 of a honeycomb substrate, of which only one channel is shown in cross-section for clarity. The first SCR catalyst composition 18 extends from the inlet end 22 of the substrate 12 through less than the entire axial length L of the substrate 12. The length of the first SCR catalyst composition 18 is denoted as first zone 18a in FIG. 1. The first SCR catalyst composition 18 can, in specific embodiments comprise vanadia/titania. The second SCR catalyst composition 20 can, in specific embodiments, comprise a metal-exchanged 8-ring small pore molecular sieve. The second SCR catalyst composition 20 extends from the outlet end 24 of the substrate 12 through less than the entire axial length L of the substrate 12. The length of the second catalyst composition is denoted as the second zone 20b in FIG. 1. The SCR catalyst system 10 is effective for the selective catalytic reduction of $NO_x$.

It will be appreciated that length of the first zone and the second zone can be varied. In one or more embodiments, the first zone and second zone can be equal in length. In other embodiments, the first zone can be 20%, 25%, 35% or 40%, 60%, 65%, 75% or 80% of the length L of the substrate, with the second zone respectively covering the remainder of the length L of the substrate.

Figure 2:
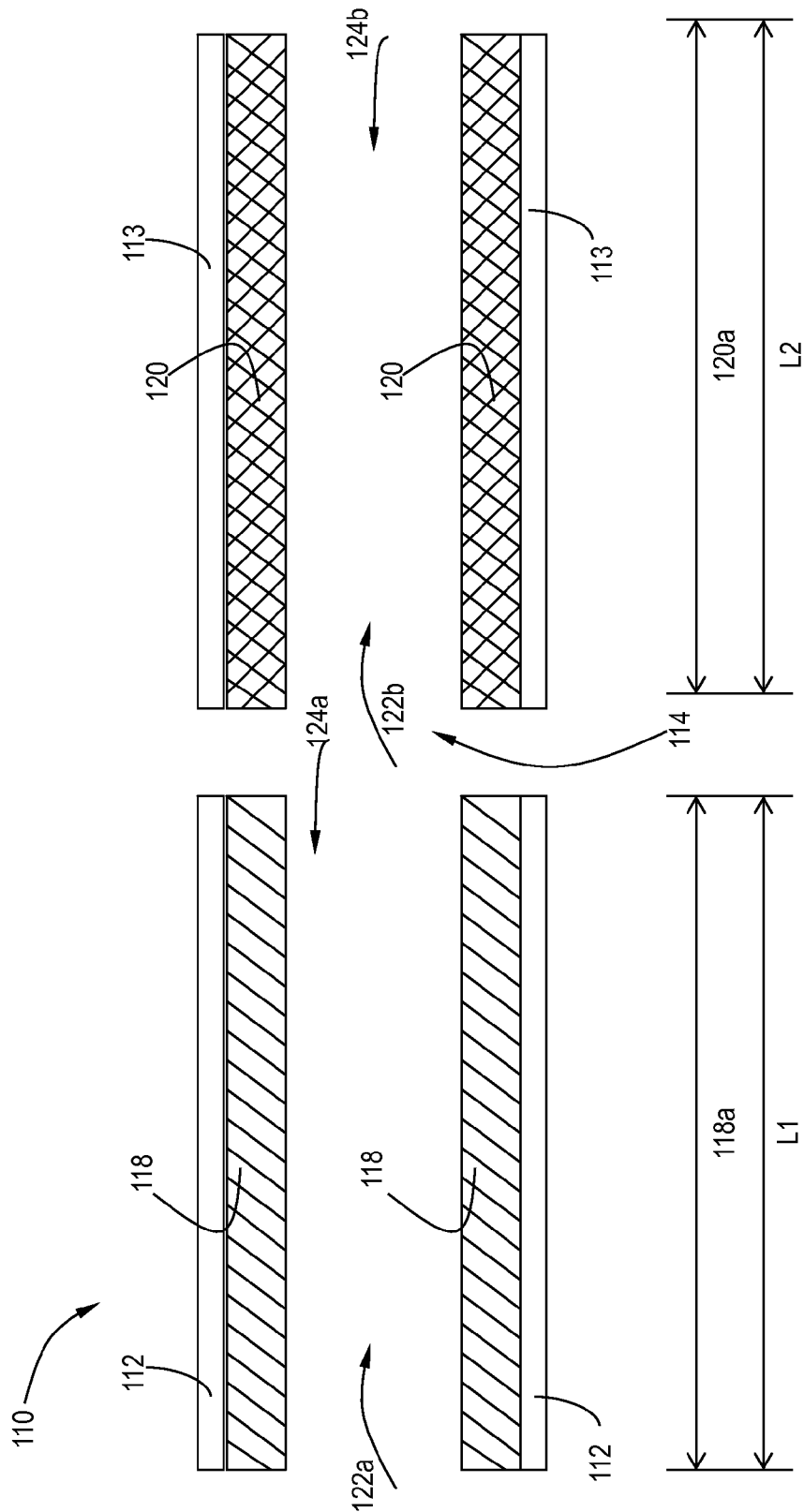
FIG. 2 shows a partial cross-sectional view of a SCR catalyst system according to one or more embodiments.

Referring to FIG. 2, another embodiment of a laterally zoned SCR catalyst system 110 is shown. The SCR catalyst system 110 shown is a laterally zoned arrangement where the first SCR catalyst composition 118 is located upstream of the second SCR catalyst composition 120 on separate substrates 112 and 113. The first SCR catalyst composition 118 is disposed on a substrate 112, and the second SCR catalyst composition is disposed on a separate substrate 113. The substrates 112 and 113 can be comprised of the same material or a different material. The substrate 112 has an inlet end 122a and an outlet end 124a defining an axial length L1. The substrate 113 has an inlet end 122b and an outlet end 124b defining an axial length L2. In one or more embodiments, the substrates 112 and 113 generally comprise a plurality of channels 114 of a honeycomb substrate, of which only one channel is shown in cross-section for clarity. The first SCR catalyst composition 118 extends from the inlet end 122a of the substrate 112 through the entire axial length L1 of the substrate 112 to the outlet end 124a. The length of the first SCR catalyst composition 118 is denoted as first zone 118a in FIG. 2. The first SCR catalyst composition 118 can, in specific embodiments, comprise vanadia/titania. The second SCR catalyst composition 120 can, in specific embodiments, comprise a metal-exchanged 8-ring small pore molecular sieve. The second SCR catalyst composition 120 extends from the outlet end 124b of the substrate 113 through the entire axial length L2 of the substrate 113 to the inlet end 122b. The second catalyst composition 120 defines a second zone 120a. The SCR catalyst system 110 is effective for the selective catalytic reduction of $NO_x$. The length of the zones 118a and 120a can be varied as described with respect to FIG. 1.

One or more embodiments of the present invention are directed to a selective catalytic reduction (SCR) catalyst system comprising a first SCR catalyst composition comprising vanadia/titania disposed on a substrate and a second SCR catalyst composition comprising a metal-exchanged 8-ring small pore molecular sieve disposed on a substrate, wherein the first SCR catalyst composition and the second SCR catalyst composition are in a layered arrangement or relationship. In one or more embodiments, the first SCR catalyst composition is layered on top of the second SCR catalyst composition.

According to one or more embodiments, the second SCR catalyst composition is washcoated onto a substrate, and then the first SCR catalyst composition is washcoated in a layer overlying the second SCR catalyst composition. In one or more embodiments, the layering is designed to optimize the first catalyst composition/second catalyst composition dry gain for a desirable balance between the benefits of acting as a protective shield and the potential drawbacks of diffusion barrier increase. Under low temperatures for extended operations, sulfur is a major concern for Cu-CHA catalysts. In comparison, vanadia/titania ($V_2O_5/TiO_2$) SCR catalysts are known for having superior sulfur tolerance.

The first and second SCR catalyst compositions can include the compositions as described above.

Figure 3:
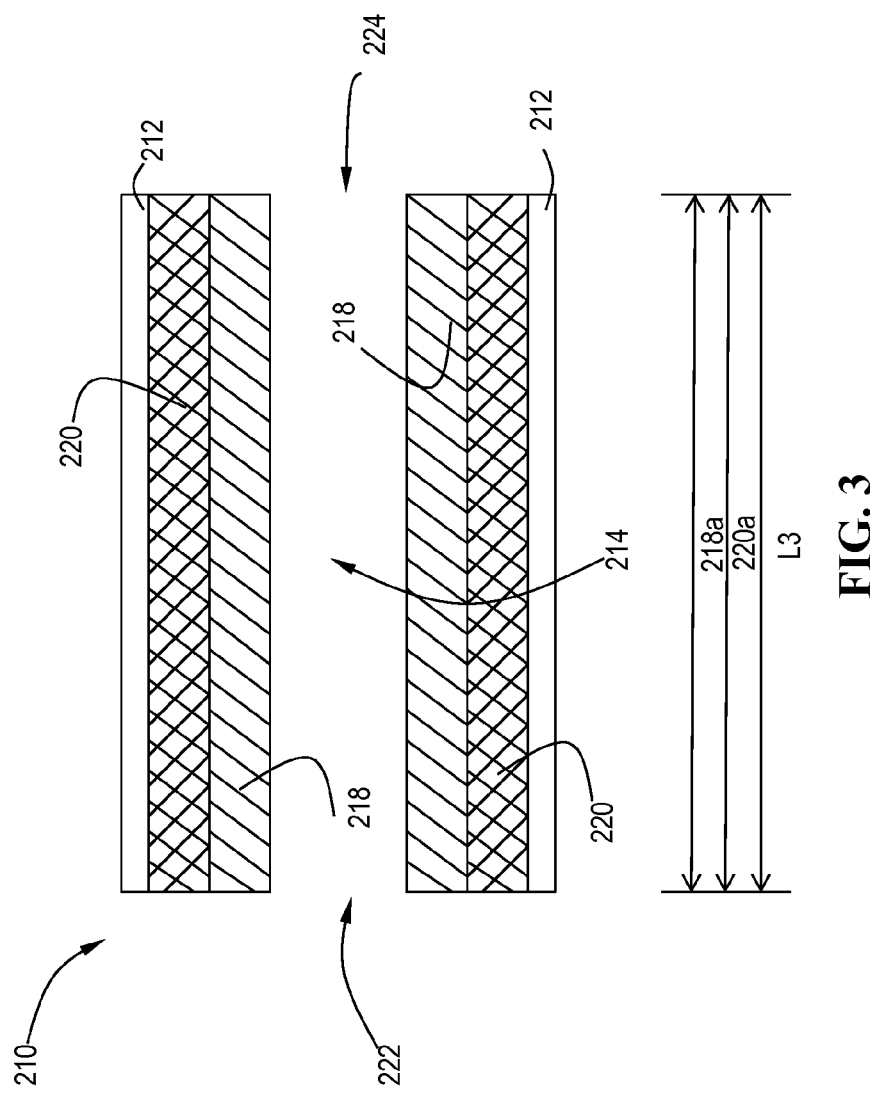
FIG. 3 shows a partial cross-sectional view of a SCR catalyst system according to one or more embodiments.

Referring to FIG. 3, an exemplary embodiment of a layered SCR catalyst system 210 is shown. The SCR catalyst system can be in a layered arrangement where the first SCR catalyst composition 218 is layered on top of the second SCR catalyst composition 220 on a common substrate 212. The substrate 212 has an inlet end 222 and an outlet end 224 defining an axial length L3. In one or more embodiments, the substrate 212 generally comprises a plurality of channels 214 of a honeycomb substrate, of which only one channel is shown in cross-section for clarity. The first SCR catalyst composition 218 extends from the inlet end 222 of the substrate 212 through the entire axial length L3 of the substrate 212 to the outlet end 224. The length of the first SCR catalyst composition 218 is denoted as 218a in FIG. 3. The first SCR catalyst composition 218 can, in specific embodiments, comprise vanadia/titania. The second SCR catalyst composition 220 can, in specific embodiments, comprise a metal-exchanged 8-ring small pore molecular sieve. The second SCR catalyst composition 220 extends from the outlet end 224 of the substrate 212 through the entire axial length L3 of the substrate 212 to the outlet end 224. The SCR catalyst system 210 is effective for the selective catalytic reduction of $NO_x$.

It will be appreciated that the thickness of the layer 218 can be relatively thin compared to the thickness of the layer 220. The thickness of layer 218 can be sufficiently thick to form a protective overcoat on layer 220 to protect the catalyst composition of layer 220 from sulfation. In one embodiment, the thickness of the first catalyst composition layer 218 is 5-10% of the overall thickness of the composite layer 218 and 220. In other embodiments, the thickness of the first catalyst composition layer is 20-30% of the overall thickness of the composite layer 218 and 220. In some embodiments, the thickness of the first catalyst composition layer is 30-40% of the overall thickness of the composite layer 218 and 220.

Exhaust Gas Treatment System:

In one aspect of the invention, exhaust gas treatment system comprises a lean burn engine, and exhaust gas conduit in fluid communication with the lean burn engine, and a selective catalytic reduction catalyst system including a first SCR catalyst composition and a second SCR catalyst composition arranged in the system according to one or more embodiments. In specific embodiments, the lean burn engine is a heavy duty diesel engine.

In one or more embodiments, the exhaust gas treatment system includes an exhaust gas stream containing a reductant such as ammonia, urea and/or hydrocarbon, and in specific embodiments, ammonia and/or urea. In specific embodiments, the exhaust gas treatment system further comprises a second exhaust gas treatment component, for example, a soot filter or a diesel oxidation catalyst.

The soot filter, catalyzed or non-catalyzed, may be upstream or downstream of the SCR catalyst system according to one or more embodiment. The diesel oxidation catalyst in specific embodiments is located upstream of the SCR catalyst system according to one or more embodiments. In specific embodiments, the diesel oxidation catalyst and the catalyzed soot filter are upstream from the SCR catalyst system.

In specific embodiments, the exhaust is conveyed from the lean burn engine to a position downstream in the exhaust system, and, in more specific embodiments, containing $NO_x$, where a reductant is added and the exhaust stream with the added reductant is conveyed to the SCR catalyst system according to one or more embodiments.

In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst may be provided downstream of the SCR catalyst system to remove any slipped ammonia from the system. In specific embodiments, the AMOX catalyst may comprise a platinum group metal such as platinum, palladium, rhodium or combinations thereof. In more specific embodiment, the AMOX catalyst can include a washcoat containing SCR catalyst system including a first SCR catalyst composition disposed on a substrate and a second SCR catalyst composition disposed on a substrate.

AMOX and/or SCR catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

SCR Activity:

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of Catalyst Materials

Vanadia-Titania Catalyst

A standard vanadia/titania/tungsten ($V_2O_5$ (2.5%)/$WO_3$ (10%)/$TiO_2$) catalyst was prepared and a slurry was made at about 30-40% solids by milling to provide a washcoat slurry.

Cu-Zeolite

A CuCHA (SSZ-13) powder catalyst was prepared by mixing 100 g of Na-form CHA, having a silica/alumina mole ratio of 30, with 400 mL of a copper (II) acetate solution of about 1.0 M. The pH was adjusted to about 3.5 with nitric acid. An ion-exchange reaction between the Na-form CHA and the copper ions was carried out by agitating the slurry at about 80° C. for about 1 hour. The resulting mixture was then filtered to provide a filter cake, and the filter cake was washed with deionized water in three portions until the filtrate was clear and colorless, and the washed sample was dried.

The obtained CuCHA catalyst comprised CuO at a range of about 2.5 to 3.5% by weight, as determined by ICP analysis. A CuCHA slurry was prepared to 40% target solids. The slurry was milled and a binder of zirconium acetate in dilute acetic acid (containing 30% $ZrO_2$) was added into the slurry with agitation.

Example 2—Catalyst System Laterally Zoned

The slurries described above were separately coated onto 12"D×6"L cellular ceramic substrate having a cell density of 400 cpsi (cells per square inch) and a wall thickness of 4 mil. The coated substrates were dried at 110° C. for 3 hours and calcined at about 400° C. for 1 hour. The coating process was repeated once to obtain a target washcoat loading of in the range of 3 g/in³ on the vanadia-titania coated core, and 2.1 g/in³ on the CuCHA coated core. The samples were aged for 200 hours at 550° C. on a heavy duty diesel engine test cell.

Comparative Example 3—Catalyst System Laterally Zoned

Example 2 was repeated except both substrates were coated with CuCHA at the same loading.

Example 4—Engine Testing of Laterally Zoned Systems

The catalyst systems in Example 3 and 4 were tested out on a 9 L heavy duty engine together with a motoring electric dynamometer. The test bench is capable of running both steady-state and transient test cycles. In the current work, both a Heavy duty transient test cycle (HDTP) and a non-road transient test cycle (NRTC) were run. Catalysts samples were full size 12" diameters parts (400/4), which were 200 h-550° C. engine aged prior to evaluations. To demonstrate the advantage of the lateral zoned system of a 12"×6" V-SCR brick upstream of a 12"×6" Cu-CHA brick, a reference sequential 12"×6" Cu+12"×6" Cu SCR system was also evaluated. In such a comparative study, only the first SCR catalyst brick were switched between V-SCR and Cu-SCR, other systems such as the second SCR brick, urea injection system, sample probing locations were kept the same.

During evaluation tests, two MKS FTIR samplers were positioned at SCR upstream and downstream, respectively, for gaseous emissions measurements, including, but not limited to, NO, NO2, and N2O etc. Exhaust sampling lines were heated at constant 190° C. All evaluation tests in this Example were run with ULSD (ultra low sulfur diesel) fuel where sulfur concentration is less than 15 ppm (wt %).

In one configuration, a diesel oxidation catalyst and catalyzed soot filter were placed upstream of the SCR catalyst system to simulate a heavy duty engine transient cycle. In another configuration, the SCR catalyst system was tested without upstream catalysts or filters.

Figure 4:
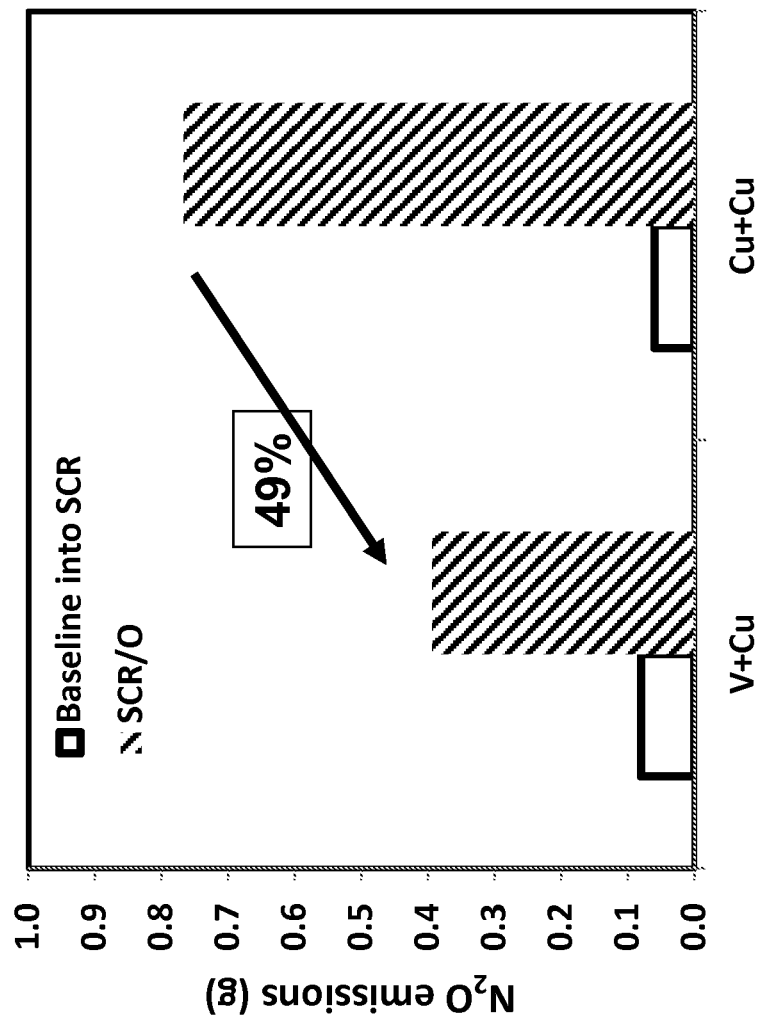
FIG. 4 is a graph comparing $N_2O$ emissions for a SCR catalyst system according to one or more embodiments and a comparative system.
Figure 5:
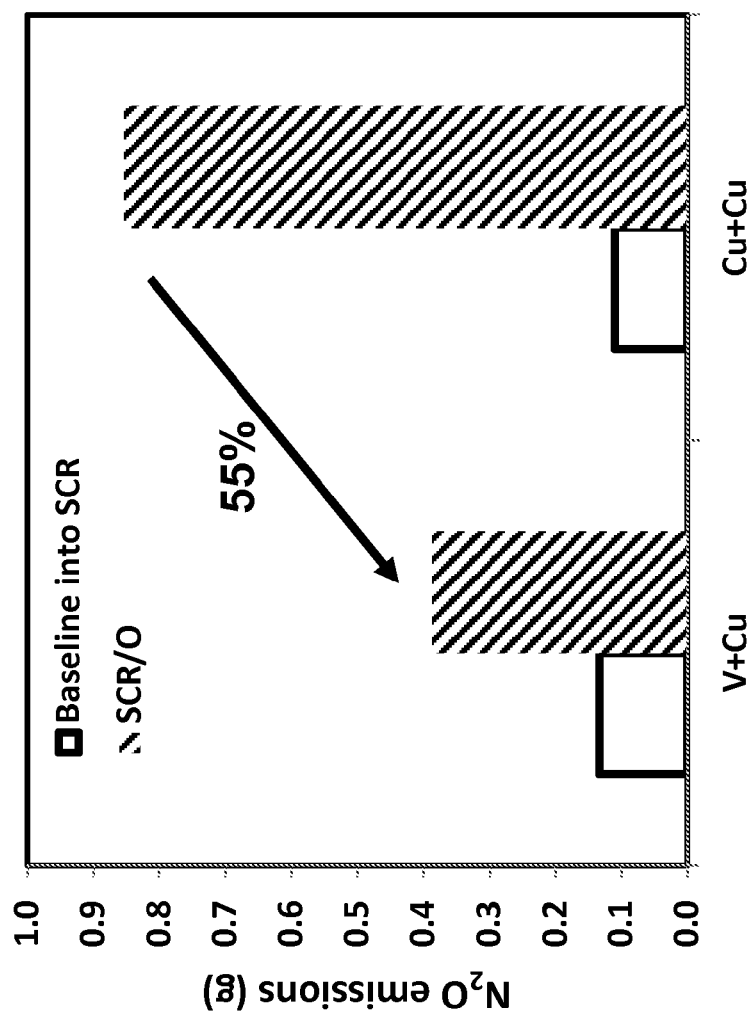
FIG. 5 is a graph comparing $N_2O$ emissions for a SCR catalyst system according to one or more embodiments and a comparative system.

FIG. 4 shows the results from the HDTP cycle and FIG. 5 shows the results from the NRTC cycle. Both tests showed the significant reduction in $N_2O$ emission for the samples in which the vanadia-titania catalyst was placed upstream of the Cu-zeolite sample.

Figure 6:
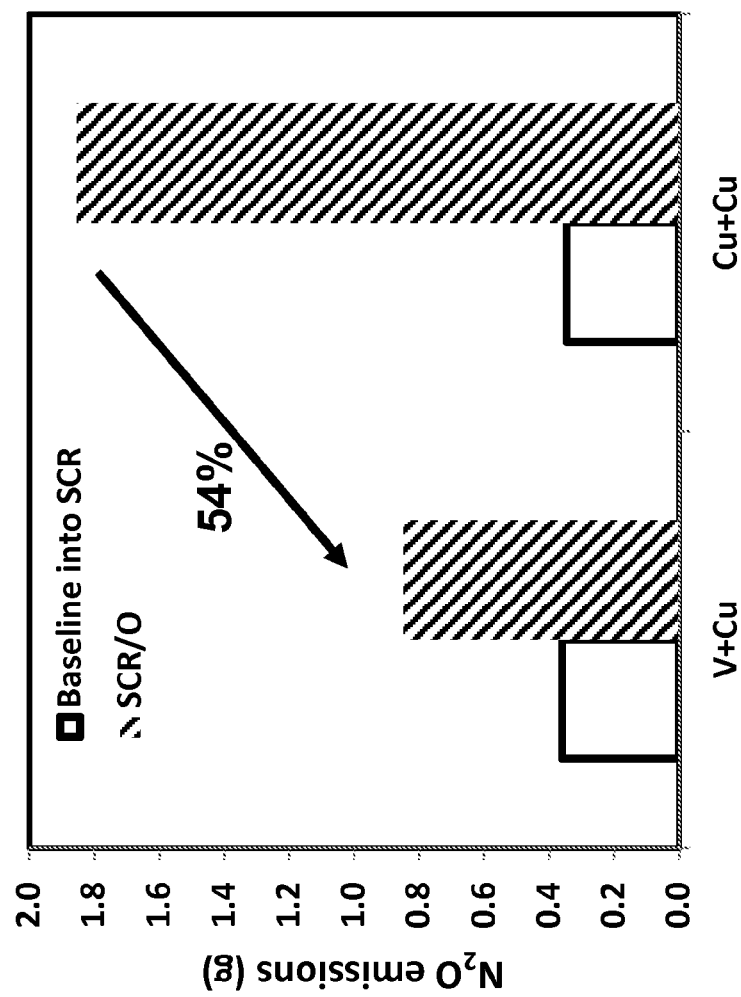
FIG. 6 is a graph comparing $N_2O$ emissions for a SCR catalyst system according to one or more embodiments and a comparative system, both systems with an upstream diesel oxidation catalyst.
Figure 7:
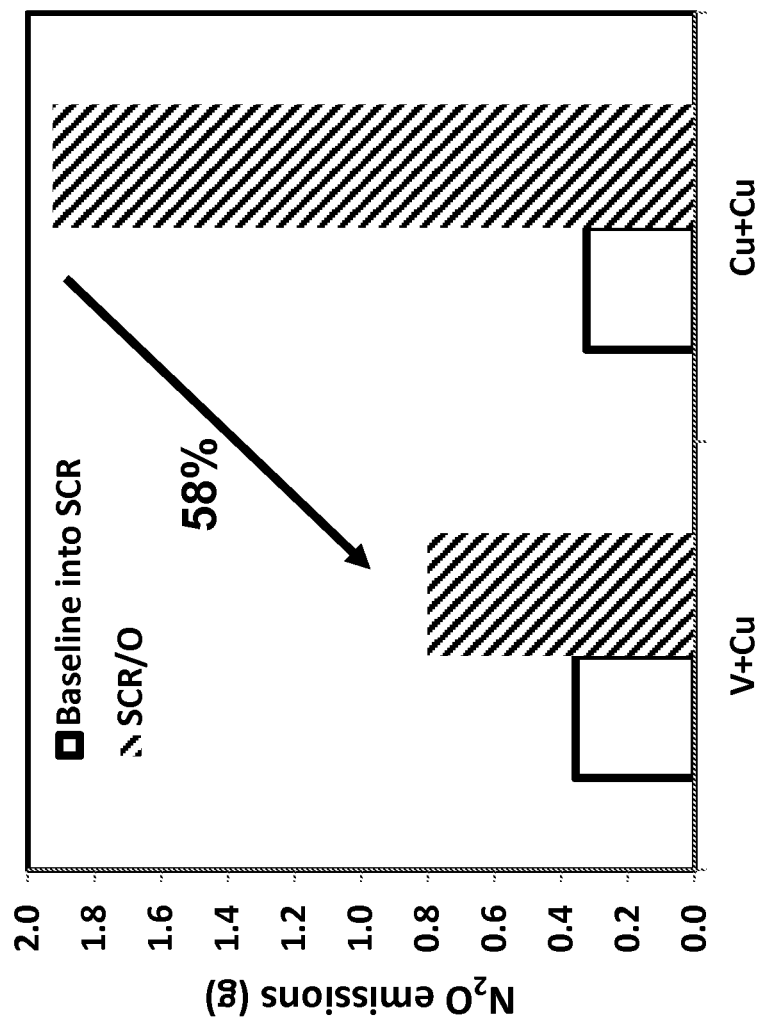
FIG. 7 is a graph comparing $N_2O$ emissions for a SCR catalyst system according to one or more embodiments and a comparative system, both systems with an upstream diesel oxidation catalyst.

The tests were repeated with an upstream diesel oxidation catalyst and catalyzed soot filter. FIG. 6 shows the results for the HDTP cycle, and FIG. 7 shows the results for the NRTC. Again, the system with the vanadia-titania catalyst upstream of the Cu Zeolite system showed much lower $N_2O$ emissions.

Example 5—Preparation of Layered Catalyst System

Washcoats from Example 1 were utilized and coated onto a single substrate in a layered configuration as described with respect to FIG. 3. The layering was varied as follows for the following samples.
Comparative Sample 5A CuCHA Single Coat 2.1 g/in$^3$
Comparative Sample 5B Bottom Coat CuCHA 2.1 g/in$^3$; Top Coat 0.2 g/in$^3$ Titania
Sample 5C CuCHA Bottom Coat—CuCHA 2.1 g/in$^3$; Top Coat 0.1 g/in$^3$ Vanadia Titania
Sample 5D CuCHA Bottom Coat 2.1 g/in$^3$; Top Coat 0.2 g/in$^3$ Vanadia Titania
Sample 5E CuCHA Bottom Coat 2.1 g/in$^3$; Top Coat 0.5 g/in$^3$ Vanadia-Titania
Sample 5F CuCHA Bottom Coat 2.1 g/in3; Top Coat 1 g/in$^3$ Vanadia Titania Example 6—Testing of Layered System Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 hr$^{-1}$ across a 150° C. to 460° C. temperature range.

The samples were aged in the presence of 10% $H_2O$ at 550° C. for 4 hours, followed by measurement of the nitrogen oxides SCR efficiency and selectivity by the same process as outlined above for the SCR evaluation on a fresh catalyst core.

Nitrogen oxides selective catalytic reduction (SCR) efficiency and selectivity of a fresh catalyst core was measured by adding a feed gas mixture of 500 ppm of NO, 500 ppm of $NH_3$, 10% $O_2$, 5% $H_2O$, balanced with $N_2$ to a steady state reactor containing a 1"D×3"L catalyst core. The reaction was carried at a space velocity of 80,000 hr$^{-1}$ across a 150° C. to 460° C. temperature range.

Samples prepared as above were tested for SCR performance. In addition, all of the samples except for 5F were exposed to sulfur (sulfation) at 300° C. at 20 ppm $SO_2$ and 5% $H_2O$ and 10% $O_2$ in a feed gas upstream of a DOC core with the SCR catalysts downstream for 6 hours.

Figure 8:
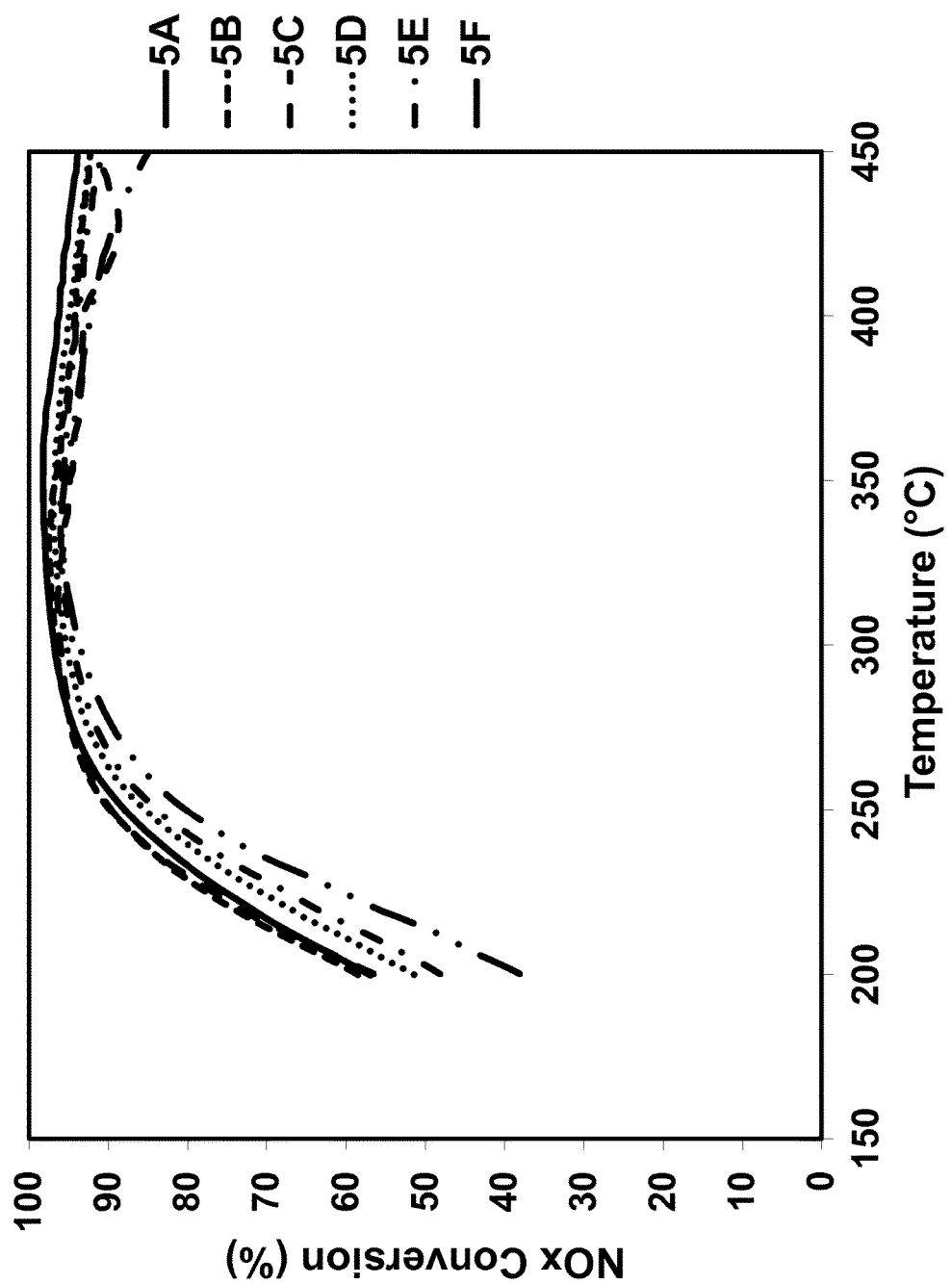
FIG. 8 is a graph comparing $NO_x$ conversions for a SCR catalyst system according to one or more embodiments and a comparative system, both systems with an upstream diesel oxidation catalyst.
Figure 9:
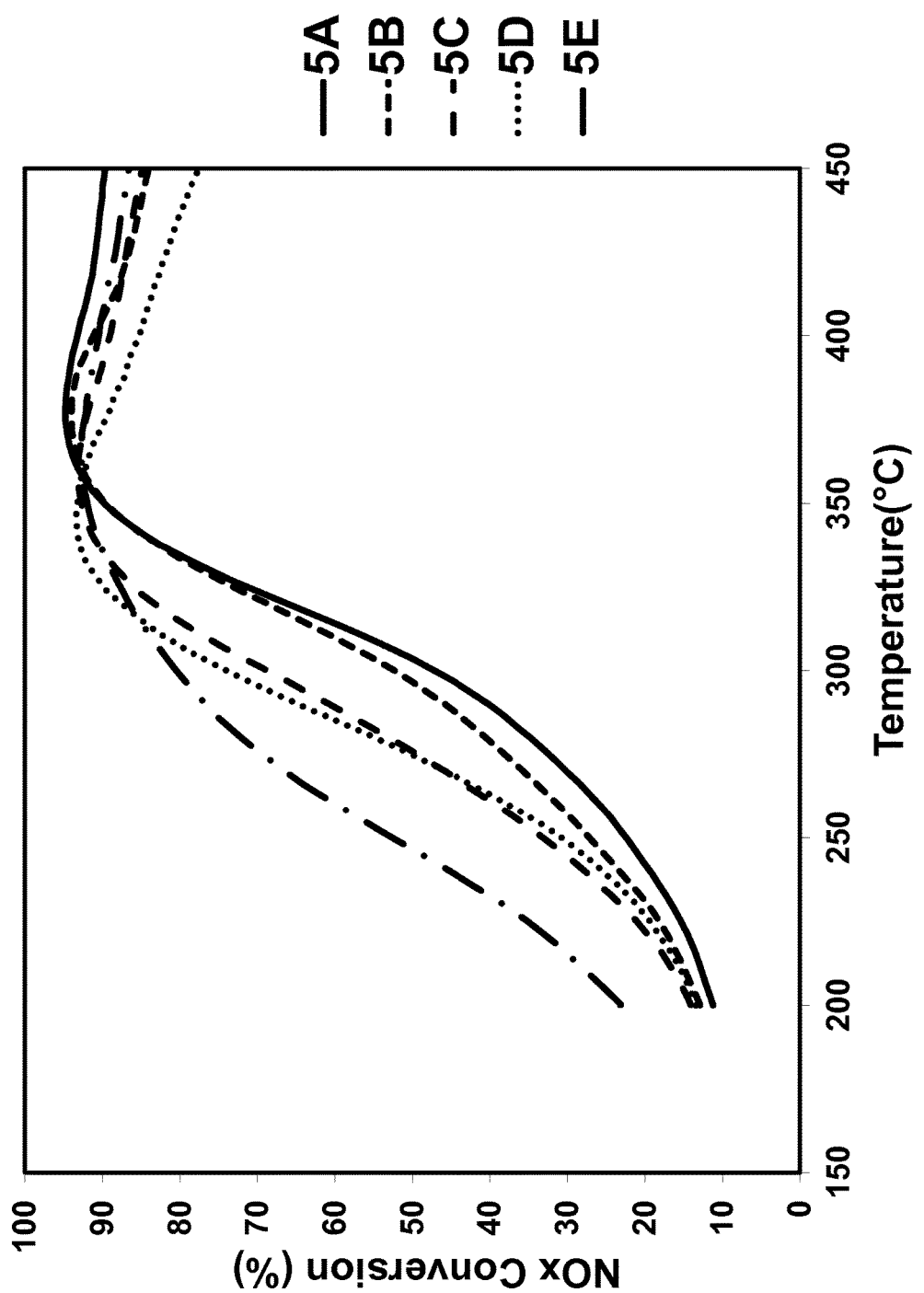
FIG. 9 is a graph comparing $NO_x$ conversions after sulfation for a SCR catalyst system according to one or more embodiments and a comparative system, both systems with an upstream diesel oxidation catalyst.

FIG. 8 shows the $NO_x$ conversion versus temperature for samples 5A-F before sulfation and FIG. 9 shows NOx conversion versus temperature after sulfation. The fresh conversions were comparable for all samples, except for sample 5F. For the sulfated sample, FIG. 9 shows that sample 5E had significantly better $NO_x$ conversion.

Example 9—Dynamic Response Modeling

Figure 10:
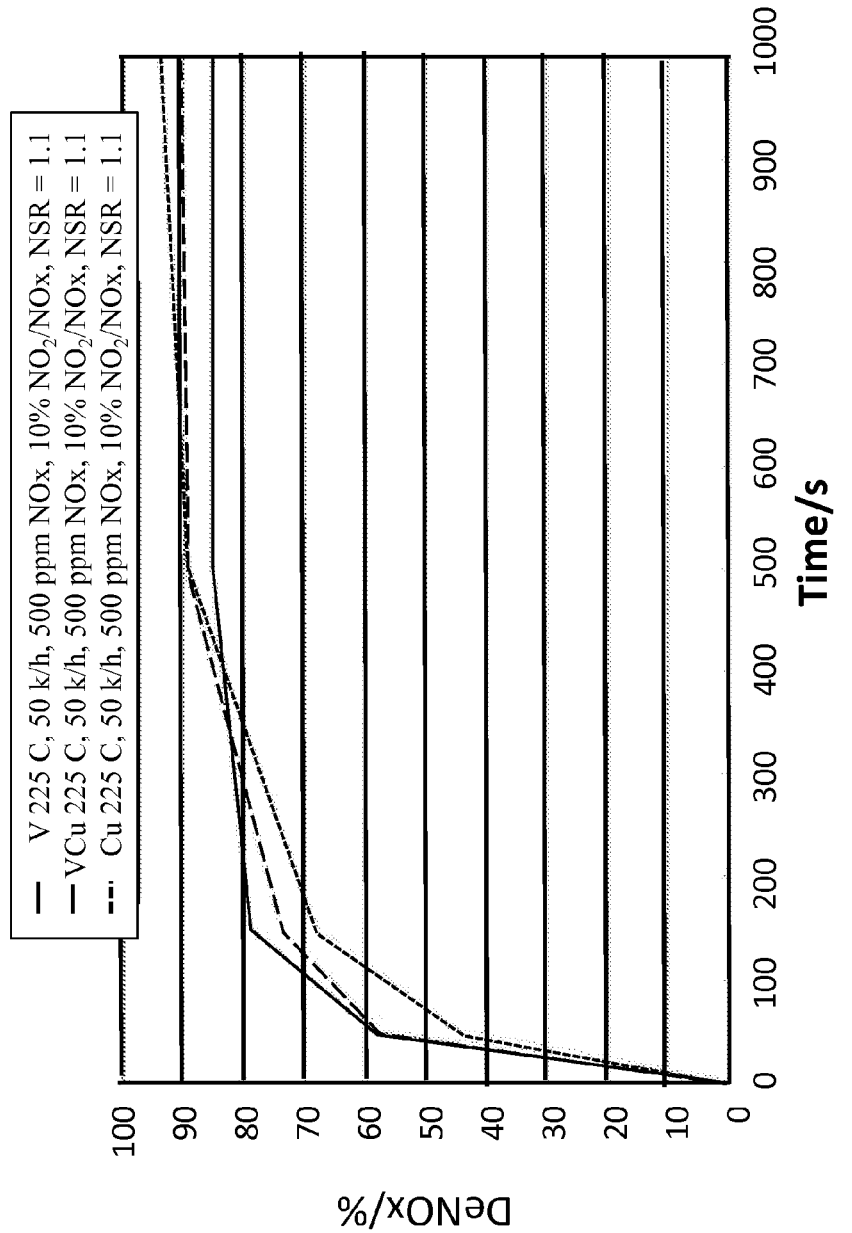
FIG. 10 is a graph generated by a computer model as described in Example 6, showing an Analysis of Response Curves-DeNO$_x$ vs. Time at 225° C. and 10% $NO_2$.
Figure 11:
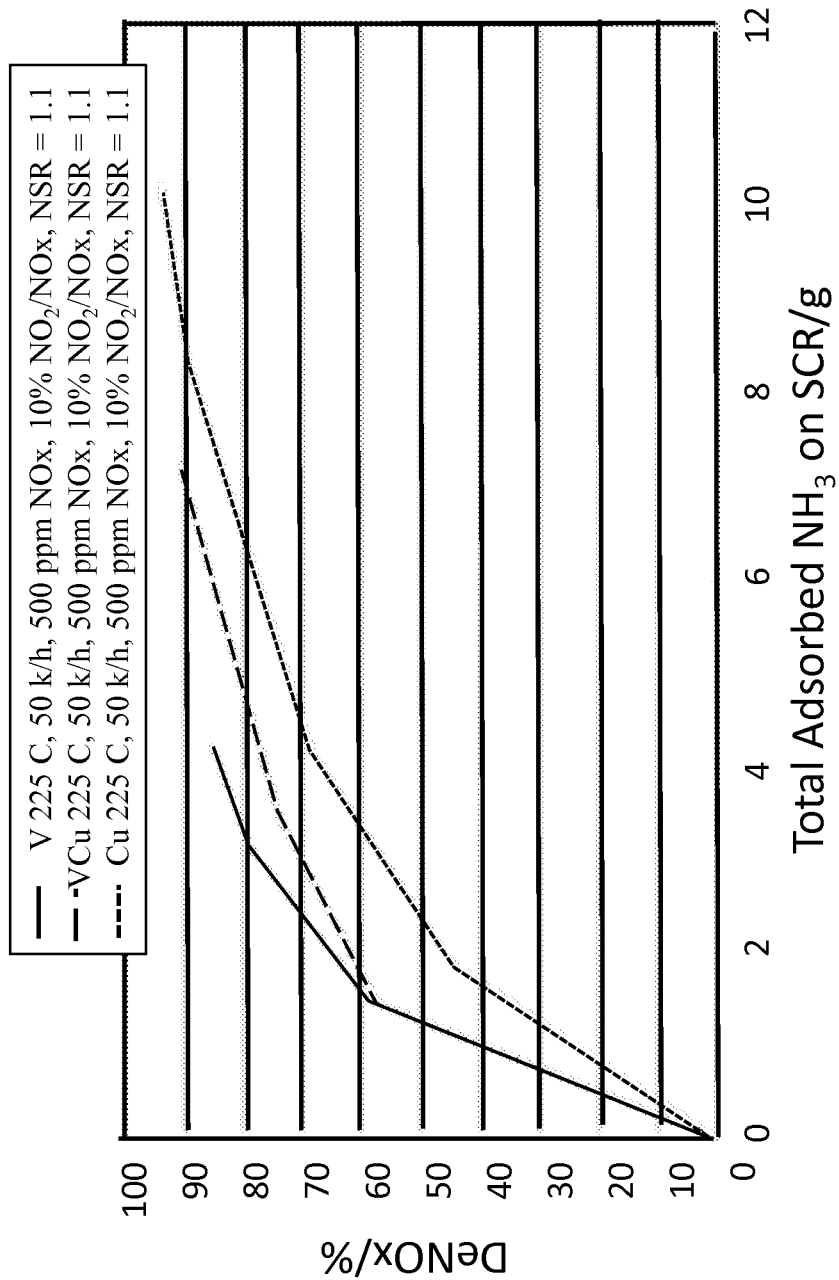
FIG. 11 is a graph generated by a computer model as described in Example 6, showing an Analysis of Response Curves-DeNO$_x$ vs. Total Absorbed $NH_3$ at 225° C. and 10% $NO_2$.

FIGS. 10 and 11 illustrate the improvements in dynamic response behavior of a system according to one or more embodiments. FIGS. 10 and 11 were prepared using a computer model. Lab reactor and engine lab DeNO$_x$ performance measurements to describe the performance of the individual components within the system are the input for the computer model used. The example in FIG. 10 shows the DeNO$_x$ performance as a function of time obtained with fresh systems without ammonia stored prior to the start of the simulation/urea dosing. A Cu-SSZ13 system and a Vanadia based SCR system are compared with the Vanadia/Cu-SSZ-13 hybrid system. The Vanadia based SCR catalyst was placed in front of the Cu-SSZ13 catalyst with a 50/50 size ratio within the modeled hybrid system. Low temperature operation at 225° C. exhaust temperature and 50000 l/h space velocity at 500 ppm $NO_x$ inlet concentration at an $NO_2/NO_x$ ratio of 10% was used for the comparison. These SCR inlet conditions can be seen as being typical for systems operated in engine applications with a low precious metal loading on an oxidation system in front of the SCR or in SCR only systems. The NSR was chosen at 1.1 in order to reach relatively fast the maximum DeNO$_x$ performance of the systems studied. Although the Cu-SSZ13 system reaches higher DeNO$_x$ performances after 700 sec. of dosing, the DeNO$_x$ response behavior after start of dosing at 0 sec. has a different ranking. The response of the Vanadia based SCR system is faster relative to the DeNO$_x$ increase after start of dosing compared with the Cu-SSZ13 system (e.g. up to 350 sec.). The hybrid system Vanadia-based SCR in combination with the Cu-SSZ13 has the advantage of being close to the dynamic response behavior of the Vanadia-based SCR and additionally delivering higher steady state DeNO$_x$ performances as indicated in FIG. 10 after, for example, 1000 sec.

FIG. 11 was generated by re-plotting FIG. 10 by using the total adsorbed $NH_3$ on the catalysts in grams as the x-axis results. The practical advantage of the hybrid system can be seen when comparing the necessary ammonia stored on the catalysts to reach e.g. 70% DeNO$_x$. The Cu-SSZ13 system needs approximately 4.5 g $NH_3$, while the Vanadia-based system would need approximately 2.5 g, and the proposed hybrid system approximately 3 g ammonia stored. The hybrid system therefore would deliver DeNO$_x$ performance faster and at lower $NH_3$ storage levels compared with the Cu-SSZ13 SCR system. Furthermore the hybrid system would deliver higher DeNO$_x$ steady state performance compared with the Vanadia based SCR system. The higher DeNO$_x$ performance reached at lower $NH_3$ storage levels has a further advantage when the engine accelerates with sudden increases in exhaust temperature. In this case, the amount of ammonia desorbed from the catalysts due to the temperature increase is less for the hybrid system compared with the Cu-SSZ13 system and therefore would result into lower $NH_3$ slip values behind the SCR portion of the aftertreatment system. Even when using an ammonia oxidation catalyst is used to control the $NH_3$ slip coming from the SCR, very high ammonia peaks from acceleration events are often issues for the ammonia oxidation catalyst due to the typical volumes installed in combination with the ammonia light-off characteristics.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A selective catalytic reduction (SCR) catalyst system comprising a first SCR catalyst composition and a second SCR catalyst composition arranged in the system, the first SCR catalyst composition promoting higher $N_2$ formation and lower $N_2O$ formation than the second SCR catalyst composition, and the second SCR catalyst composition having a different composition than the first SCR catalyst composition, the second SCR catalyst composition promoting lower $N_2$ formation and higher $N_2O$ formation than the first SCR catalyst composition,
   wherein the first SCR catalyst composition is in the form of a first washcoat;
   wherein the second SCR catalyst composition is in the form of a second washcoat;
   wherein the first washcoat and the second washcoat are coated on one or more substrates in a laterally zoned configuration such that the first SCR catalyst composition is located laterally upstream of the second SCR catalyst composition according to a flow direction of an engine exhaust gas stream from an engine towards a tailpipe;
   wherein the first SCR catalyst composition comprises a mixed oxide comprising vanadia/titania; and
   wherein the second SCR catalyst composition comprises a metal-exchanged zeolite, excluding Cu-exchanged or Fe-exchanged ZSM-5 or Beta zeolites;
   wherein the SCR catalyst system provides an improved NOx conversion efficiency as compared to a SCR catalyst system comprising the first SCR catalyst composition and substantially free of the second SCR catalyst composition; and
   wherein the SCR catalyst system provides a lower $N_2O$ formation as compared to a SCR catalyst system comprising the second SCR catalyst composition and substantially free of the first SCR catalyst composition.

2. The SCR catalyst system of claim 1, wherein the first SCR catalyst composition and the second SCR catalyst composition are disposed on a common substrate.

3. The SCR catalyst system of claim 1, wherein the first SCR catalyst composition and the second SCR catalyst composition are disposed on different substrates.

4. The SCR catalyst system of claim 1, wherein the vanadia/titania is stabilized with tungsten.

5. The SCR catalyst system of claim 1, wherein the zeolite is a metal-exchanged 8-ring small pore zeolite.

6. The SCR catalyst system of claim 5, wherein the zeolite has a structure type selected from the group consisting of AEI, AFT, AFX, CHA, EAB, ERI, KFI, LEV, SAS, SAT, DDR, and SAV.

7. The SCR catalyst system of claim 5, wherein the zeolite is an aluminosilicate zeolite and has the CHA structure type.

8. The SCR catalyst of claim 7, wherein the zeolite is selected from SSZ-13 and SSZ-62.

9. The SCR catalyst system of claim 5, wherein the metal is selected from the group consisting of Cu, Fe, Co, Ce and Ni.

10. The SCR catalyst system of claim 9, wherein the metal is Cu.

11. The SCR catalyst system of claim 7, wherein the zeolite is exchanged with Cu in the range of 2% to 8% by weight.

12. A selective catalytic reduction (SCR) catalyst system comprising a first SCR catalyst composition comprising vanadia/titania disposed on a substrate and a second SCR catalyst composition comprising a metal-exchanged 8-ring small pore molecular sieve disposed on a substrate,
   wherein the first SCR catalyst composition is in the form of a first washcoat;
   wherein the second SCR catalyst composition is in the form of a second washcoat;
   wherein the first washcoat and the second washcoat are coated on one or more substrates in a laterally zoned configuration such that the first SCR catalyst composition is located laterally upstream of the second SCR catalyst composition according to a flow direction of an engine exhaust gas stream from an engine towards a tailpipe;
   wherein the metal-exchanged 8-ring small pore molecular sieve is a metal-exchanged zeolite, excluding Cu-exchanged or Fe-exchanged ZSM-5 or Beta zeolites;
   wherein the SCR catalyst system provides an improved NOx conversion efficiency as compared to a SCR catalyst system comprising the first SCR catalyst composition and substantially free of the second SCR catalyst composition; and
   wherein the SCR catalyst system provides a lower $N_2O$ formation as compared to a SCR catalyst system comprising the second SCR catalyst composition and substantially free of the first SCR catalyst composition.

13. The SCR catalyst system of claim 12, wherein the second SCR catalyst composition comprises Cu and an aluminosilicate zeolite having the CHA structure type.

14. A lean burn engine exhaust gas treatment system comprising the SCR catalyst system of claim 1, a lean burn engine, and an exhaust gas conduit in fluid communication with the lean burn engine, wherein the SCR catalyst system is downstream of the engine.

15. The system of claim 14, wherein the engine is a heavy duty diesel engine.

16. A method of removing nitrogen oxides from exhaust gas from a lean burn engine, the method comprising contacting an exhaust gas stream the SCR catalyst system of claim 1.

17. The method of claim 16, wherein the lean burn engine is a heavy duty diesel engine.

18. The SCR catalyst system of claim 13, wherein the zeolite is selected from SSZ-13 and SSZ-62.

19. The SCR catalyst system of claim 12, wherein vanadia/titania promotes higher $N_2$ formation and lower $N_2O$ formation than the metal-exchanged 8-ring small pore molecular sieve, and wherein the metal-exchanged 8-ring small pore molecular sieve promotes lower $N_2$ formation and higher $N_2O$ formation than the vanadia/titania and the 8-ring small pore molecular sieve has a higher ammonia storage capacity than the vanadia/titania.

20. The SCR catalyst system of claim 1, wherein the first SCR catalyst composition and the second SCR catalyst composition are disposed on a single flow-through substrate, or wherein the first SCR catalyst composition and the second SCR catalyst composition are disposed on separate flow-through substrates.

* * * * *